United States Patent [19]

Ducroux et al.

[11] Patent Number: 5,052,157
[45] Date of Patent: Oct. 1, 1991

[54] FLOORING SYSTEM ESPECIALLY DESIGNED FOR FACILITIES WHICH HOUSE DATA PROCESSING EQUIPMENT

[75] Inventors: Alain R. E. Ducroux, Garches; Miodrag Novakovic, Maule, both of France

[73] Assignee: Servoplan, S.A., Paris, France

[21] Appl. No.: 474,144

[22] Filed: Feb. 2, 1990

[51] Int. Cl.$^5$ .............................................. E04B 5/00
[52] U.S. Cl. .................................... 52/126.6; 52/263
[58] Field of Search ................ 52/126.4, 126.5, 126.6, 52/381, 302, 303, 301, 263

[56] References Cited

U.S. PATENT DOCUMENTS

| | | | |
|---|---|---|---|
| 3,025,934 | 3/1962 | Spiselman et al. | 52/126.6 |
| 3,218,767 | 11/1965 | Stark | 52/381 |
| 3,295,272 | 1/1967 | Kanno | 52/126.5 |
| 3,645,054 | 2/1972 | Olvera | 52/126.6 |
| 4,546,580 | 10/1985 | Ueno et al. | 52/126.5 |
| 4,773,196 | 9/1988 | Yoshida et al. | 52/126.5 |
| 4,780,571 | 10/1988 | Huang | 52/126.6 |

FOREIGN PATENT DOCUMENTS

| | | |
|---|---|---|
| WO8803207 | 5/1988 | PCT Int'l Appl. |
| 876117 | 8/1961 | United Kingdom ............... 52/126.6 |
| 2188955 | 10/1987 | United Kingdom ............... 52/126.6 |
| 2190936 | 12/1987 | United Kingdom . |

Primary Examiner—James L. Ridgill, Jr.
Attorney, Agent, or Firm—Troutman, Sanders, Lockerman & Ashmore

[57] ABSTRACT

This invention is directed to a flooring system especially designed for facilities which house data processing equipment such as data processing centers, computer rooms and offices having a false floor raised above an existing floor. This false floor is comprised of removable panels laid side-by-side upon raised support members forming channels through which cables, hoses, wires and other computer interconnections can be routed.

15 Claims, 3 Drawing Sheets

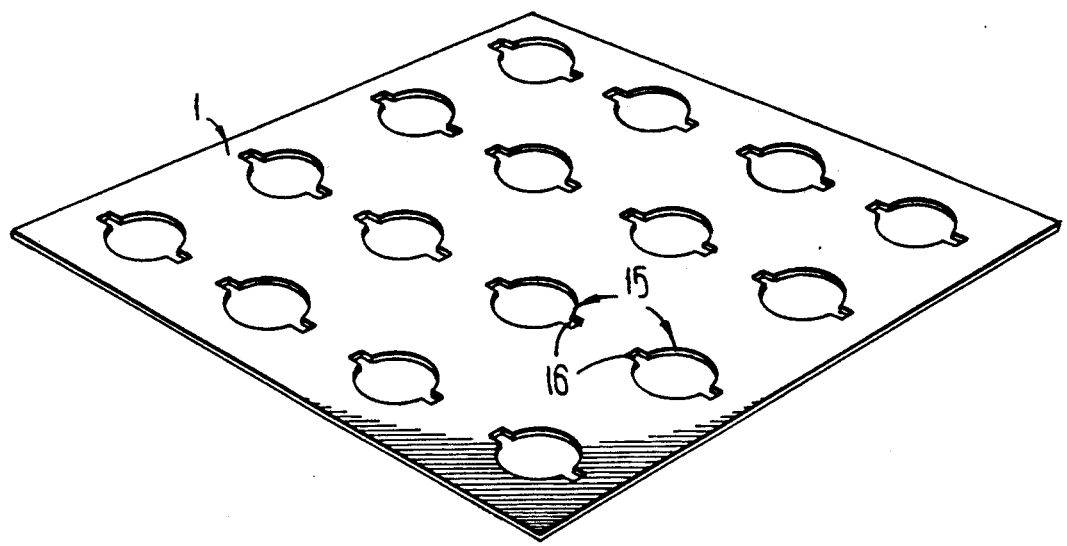
FIG 5
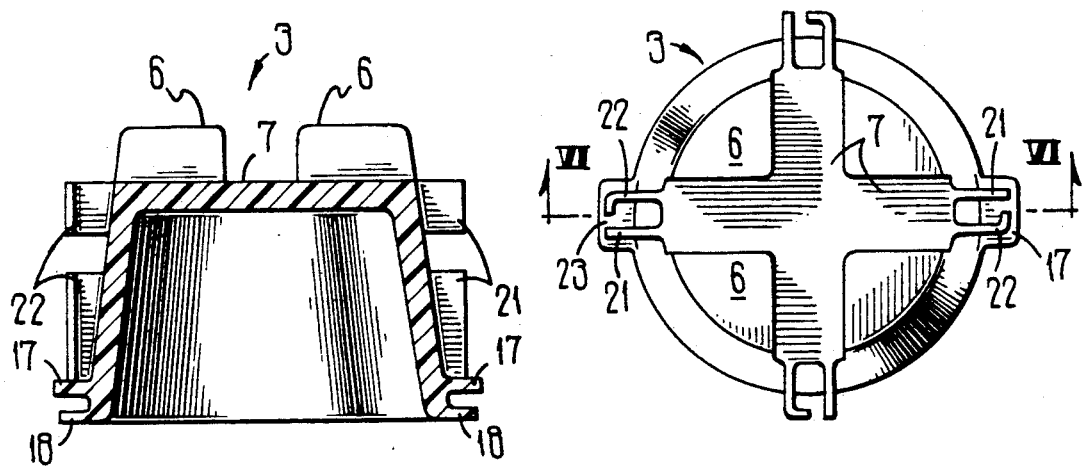
FIG 6   FIG 7
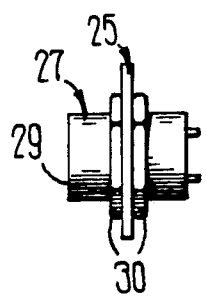   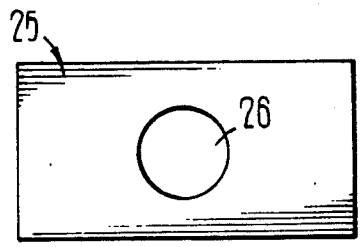
FIG 8   FIG 9

FLOORING SYSTEM ESPECIALLY DESIGNED FOR FACILITIES WHICH HOUSE DATA PROCESSING EQUIPMENT

The invention encompasses a flooring system especially designed for facilities which house data processing equipment such as data processing centers, computer rooms, offices whereby there is a false floor raised above the existing floor; this false floor is comprised of removable panels laid side by side upon raised support members in order to afford a free space where cables, hoses, wires and other computer interconnections can be routed.

Existing false flooring systems use adjustable jacks at each panel corner as a means of support.

These existing systems have considerable flaws.

As the supporting jacks are only located at the corners of the panels which are usually square shaped with sides of 500 to 600 mm, rigidity and mechanical stability of the floor must be achieved through the use of very thick panels, usually 30 to 40 mm with, sometimes, the adjunction of a framework which transfers the load to the jacks. Due to the loss of usable height, these types of false flooring require an overall height of 150 to 200 mm, which is incompatible with low ceilings in existing buildings and requires new facilities to be built with added height. As an example, if one considers a 200 mm false floor at each level of a 30-story building, the additional required height becomes 6 meters, the equivalent of two stories. Installing such a false floor in existing buildings requires the construction of ramps and steps as well as fire and soundproofing barriers. Finally, such structures are sometimes noisy and act as resonators. In any event, installing existing false floors either as part of a building renovation or in new construction, is both involved and costly.

The aim of the present invention is to offer a false flooring system which has none of the above-mentioned drawbacks.

To achieve this aim, a flooring system according to the invention is characterized by the inclusion of base plates laid side by side on the existing floor, with each base plate having on its top surface a fairly dense pattern of built-in standoffs to serve as the load support for the tiles of the false floor while at the same time forming a network of channels where cables, hoses and similar connections can be routed.

One of the advantages of the invention is the fact that each of the stand-offs has on its top surface the elements of the interlocking system for the removable floor tiles which themselves have complementary elements built in on their bottom surface.

In another aspect of the invention, the interlocking elements of a supporting stand-off are formed by a cruciform pattern of grooves while those on the under side of the floor tile are a complementary pattern formed by the bottom lip around its perimeter; the grooves on the stand-offs are twice the thickness of the bottom lip of the floor tile in order to receive two adjacent tiles while also permitting the corners of four adjacent tiles to be interlocked; similarly, the built-in stand-offs on the bottom base plates are so aligned as to allow for the juxtaposition of both rectangular and square floor tiles with their under side resting on the inner stand-offs.

Another aspect is the fact that the base plates are made of a material sufficiently flexible, such as plastic, or sheet steel, to guarantee full contact with the existing substrate. The base plates and their stand-offs can be made in one piece or as discrete parts.

Still another aspect of the invention is that the false floor's tiles are to be made of a rigid yet sufficiently supple material in order to bear fully on all the stand-offs even if the substrate is somewhat uneven.

The invention will be better understood, and its aims, aspects, details and advantages will appear more clearly in the following description with reference to the diagrams appearing in the appendix whose sole purpose are illustrative, showing two different modes of manufacturing the invention and in which:

FIG. 5 shows an alternate construction method for the bass plate in accordance with the invention.

FIG. 6 is a cross-sectional view along line VI—VI of FIG. 7, of a stand-off for the alternate construction method shown in FIG. 5.

FIG. 7 is a top view of the stand-off shown in FIG. 8.

FIG. 8 is a side view of a web with an electrical junction block which can be installed in the wiring channels as shown in FIGS. 5 to 7.

FIG. 9 is a front view of a web as shown in FIG. 8, prior to the installation of a junction block.

Figure 1:
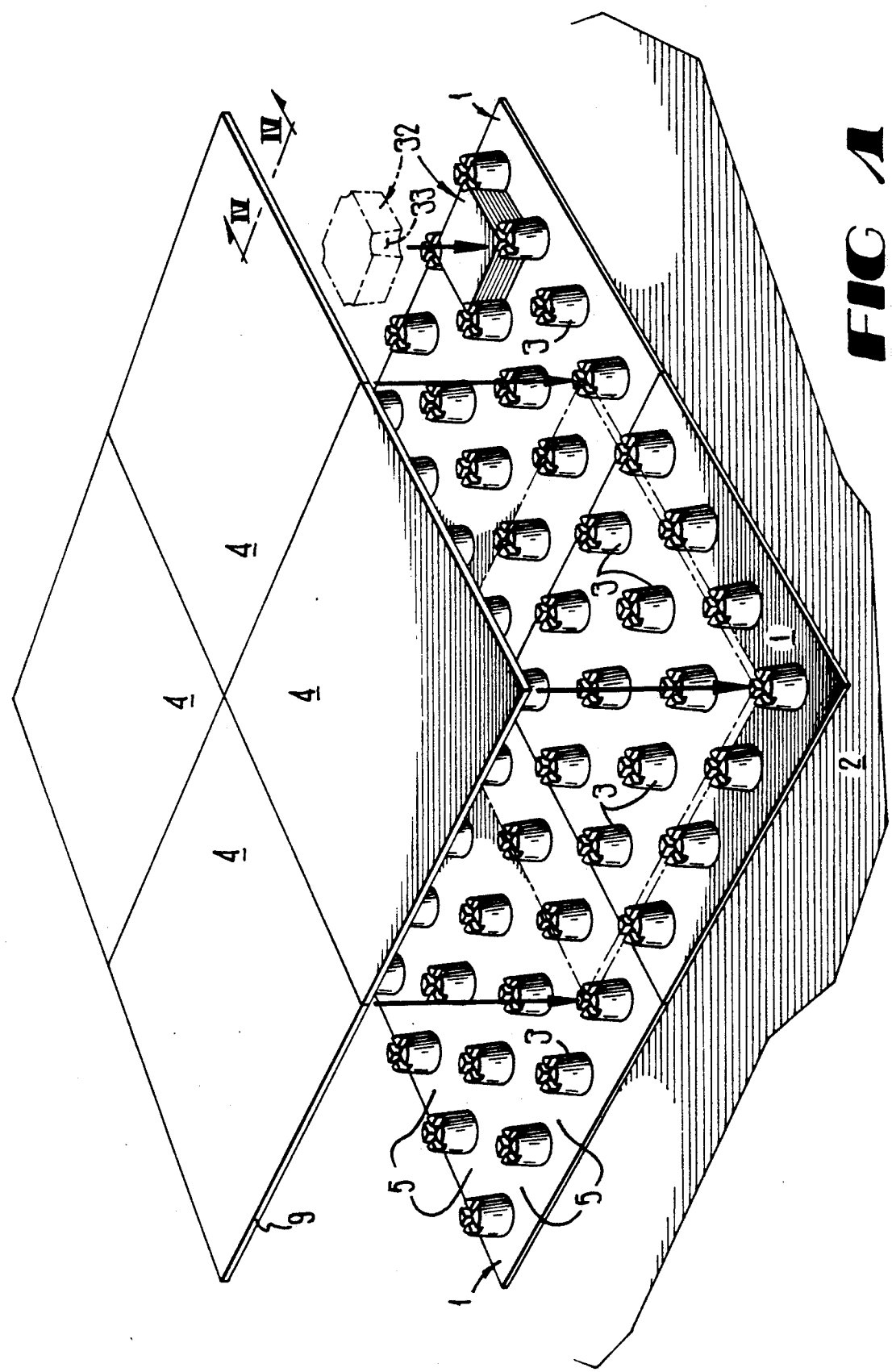
FIG. 1 is an exploded perspective of a first method of installation of a false floor according to the invention.

FIGS. 1 through 4, which show one type of construction for the false flooring system according to this invention, demonstrate how the system is comprised of base plates (1) which are laid side by side upon the substrate or existing floor (2) and carry the stand-offs (3) upon their top surface which in turn receive the floor tiles (4) which must bear the weight of the machines and equipment as well as that of the personnel.

Each base plate (1) carries a number of built-in stand-offs (3) regularly spaced on its top surface, thus forming a network of channels (5) where cables, wire, hoses, interconnections, compressed air lines, power lines, phone lines, and water pipes can be routed. Locating the stand-offs (3) in parallel rows along the edges of the base plates, which ideally are square, forms a series of parallel channels, perpendicular to each other. The arrangement of the stand-offs (3) is identical for all base plates and is such that the rows of stand-offs (3) and the channels (5) thus formed on the various adjacent base plates are all in axial alignment.

Figure 2:
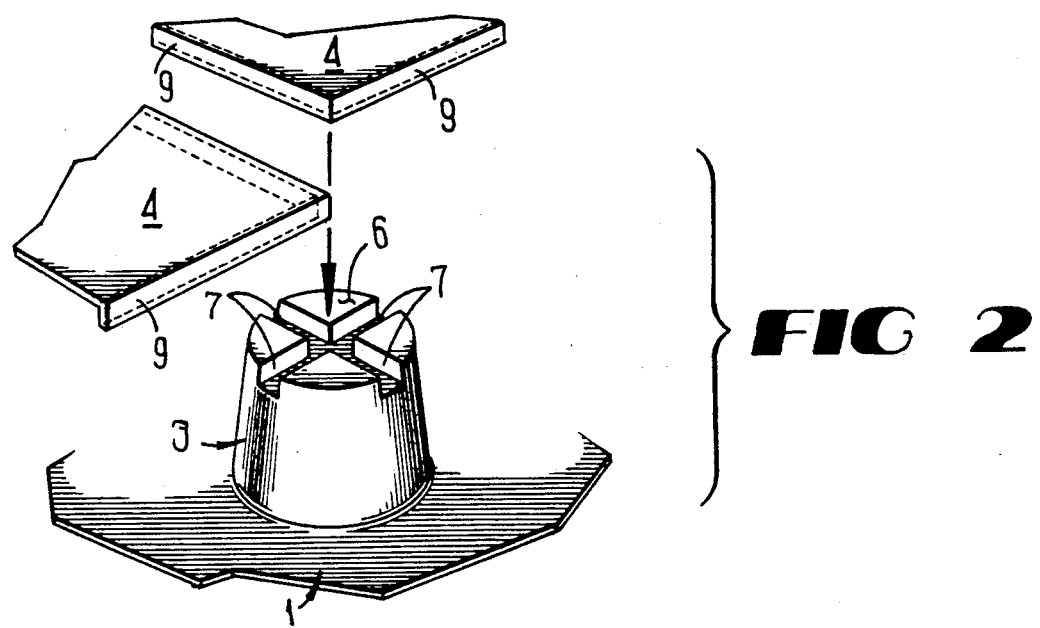
FIG. 2 is an exploded perspective in a larger scale, showing a detail of FIG. 1.
Figure 3:
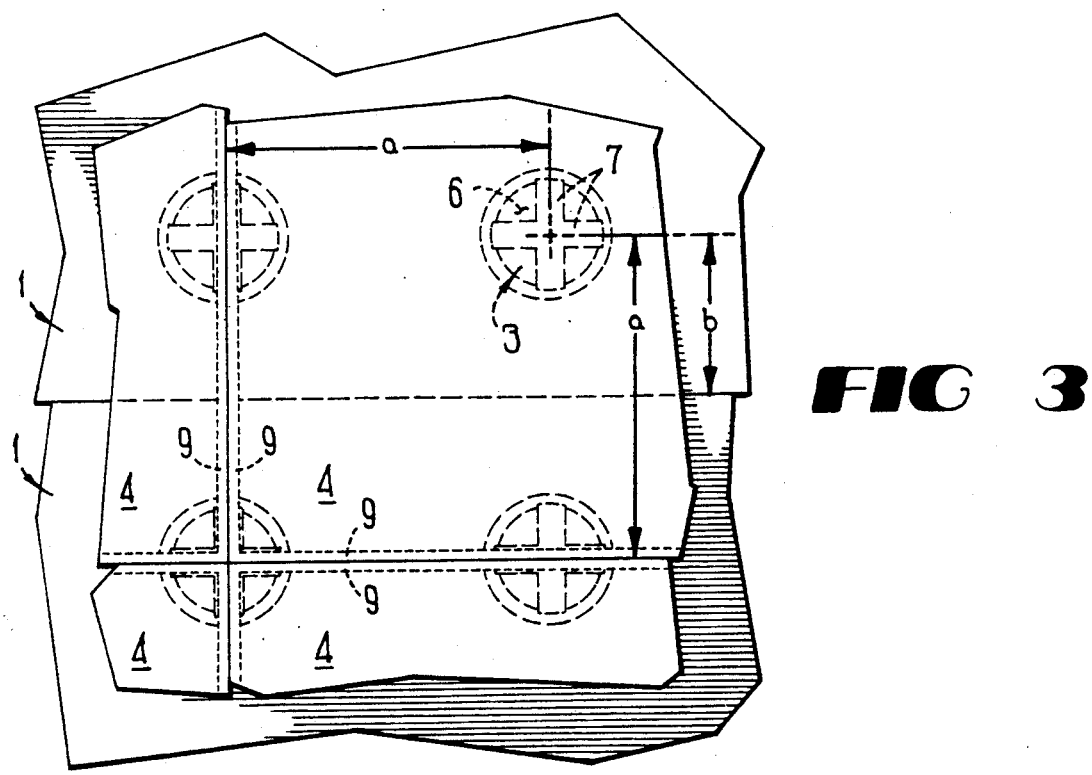
FIG. 3 is a top view of part of the flooring system shown in FIG. 1.

As shown in FIG. 2, the top plane (6) of stand-off (3) where the floor tiles (4) are supported has a configuration of interlocking elements such as cruciform grooves (7). According to FIGS. 2 and 4, the floor tiles (4), also square shaped, have complementary interlocking elements such as a continuous lip (9) around their bottom perimeter. This lip is perpendicular to the plane of the tile, and is designed to engage the grooves (7) cut into the stand-offs.

Each groove (7) is at least slightly wider than twice the thickness of the floor tile lip (9), and its depth is at least equal to that of the vertical inner side of the lip. As shown in the figures, all the grooves (7) of a row of stand-offs (3) are in alignment. The length of one side of the floor tile (4) is a multiple of the center-to-center distance (a) of the two axes of the grooves (7) of two adjacent stand-offs (3). Offset (b) of the median long axis of the groove (7) of a stand-off belonging to a row adjacent to the edge of a base plate is exactly half of distance (a). This permits a floor tile (4) to fit into the stand-offs (3) of adjacent base plates (1) and to still interlock via its bottom lip (9) and grooves (7) while its under surface (10) rests upon the plane (6) of the stand-offs. Given their aforementioned dimensions, each groove (7) can receive the lips (9) of the two coinciding floor tiles (4). The cruciform configuration of the grooves (7) enables four adjacent floor tiles to be engaged, thus positively interlocking the four tiles at their corners. Alternatively, the width of the grooves (7) could have a slight downward taper or even an undercut with a corresponding swell of the lip (9) of the floor tiles and thus afford a friction or snap action fit.

In the first fabrication mode, the base plates (1) and their stand-offs (3) are a one-piece construction, formed by heat forming or injection molding of a plastic compound such as polystyrene, polyethylene, polypropylene or ABS. Alternatively, they could easily be stamped from sheet metal.

Generally, the base plates can be made of any material which, without being soft, can conform to the possible irregularities of the substrate (2). It would be advantageous to build the base plates in such a way as to obtain hollow stand-offs.

Figure 4:
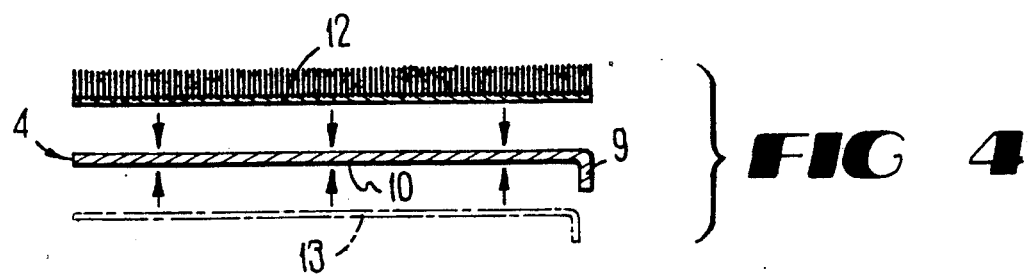
FIG. 4 is a cross-section along line IV—IV of FIG. 1.

As regards the floor tiles (4), they must be made of a rigid material and yet allow for possible variations in the plane (6) formed by the tops of the stand-offs while yielding, when butted, a rigid and strong floor. The floor tiles (4) could to advantage be made of sheet metal, perhaps galvanized steel, or any other appropriate material. As shown in FIG. 4, these tiles could be finished, on their top surface, with carpeting (12) while their under side (10) could be lined with fireproofing and soundproofing layers (13).

FIGS. 5 through 7 show a second mode of construction whereby the base plates (1) and stand-offs (3) are separate modular pieces. In this version, the plates (1) are replaced by overlay made of PVC, thin galvanized sheet steel or any other suitable material, where the stand-offs (3) of the first version are replaced by a matrix of circular holes (15) with diametrically opposed keyways (16). As shown in FIGS. 6 and 7, the stand-offs (3) are truncated cones, similar to those of the first mode. They retain the cruciform groove (7) of the former. However, the base diameter of the cone is slightly smaller than the holes (15) of the matrix. This base has two pairs of axially offset and diametrically opposed tabs (17) and (18). The lower tabs (18) or lock tabs, contrary to the upper tabs (17) are so dimensioned as to fit through the keyways (16) of the base plate.

The stand-offs (3) can thus be mounted to a base plate by placing them so that the lock tabs (18) fit through the keyways (16) while the upper tabs (17) keep them from falling through. The distance between the upper and lower tabs is more than the thickness of the plate and thus the stand-offs can be locked into position by giving them a 90-degree twist.

It must be noted that the stand-offs are equipped with radial projections (21) and (22) along the vertical axis of the cone. These provide a vertical axial slot (23) in which partitions or jambs can be inserted for closing off sections of the false floor.

As shown on FIGS. 8 and 9, the axial slots 23 can also be used to receive a web 25 which bears an electrical outlet. As such, the web 25 is pierced by a hole 26 to allow the installation of an electrical junction block 27. On one side, the plate 25 is provided with wire connectors, while on the other side the junction block 27 terminates in a standard electrial outlet 29. The junction block 27 can be attached to the web 25 with a nut 30 on each side or by any other available means.

The flooring structure according to the invention also allows for the fitting of separators anywhere in the wiring channel matrix. These separators are formed by a series of filler-blocks 32 fitted in rows between the stand-offs as shown in FIG. 1. These filler-blocks 32 should ideally be made of an acoustically and thermally insulating material. Each corner of these filler-blocks is indented 33 to complement the profile of four diagonally opposed stand-offs 3. So configured, these filler-blocks can be installed in the channels in such a way as to form a continuous wall. Such walls can be used with the system represented by FIGS. 1 to 4 as well as with that shown in FIGS. 5 to 7. Such partitioning can yield a high degree of thermal as well as acoustic insulation.

These stand-offs can be made of any material, but injection molded ABS would be advantageous.

As an example, a base plate built according to the invention would ideally be square, 500 mm on a side with a matrix of 16 stand-offs. Each stand-off has a base diameter of 50 mm and an upper diameter of 40 mm. Groove (7) width is 10 mm with a depth of 7 mm. The height of the stand-offs varies with the application.

Obviously, the number of stand-offs and the base plate size can vary as a function of the application.

In general, many modifications can be brought to the above-described structure. Thus the shape of the stand-offs can be different from the description and the means of interlocking the floor tiles can vary widely without leaving the scope of this invention.

It is, however, essential that each base plate, through its number of stand-offs and their configuration, provide multiple load-bearing areas for each floor tile in such a way that the said floor tile can be made of thin material. Therefore, and contrary to existing false floor systems, there is practically no loss in usable ceiling height due to the thickness of the structure. The false floor system described in this invention has the further advantage of easy installation while maintaining easy access to any part of the under floor equipment. Moreover, due to the multitude of bearing areas, it is easy to accommodate inspection hatches where necessary.

We claim:

1. Floor structure comprising:
a base plate having a plurality of apertures;
each of said base plate apertures including at least one keyway;
a floor tile having an interlocking element;
a plurality of load bearing stand-offs for insertion through said base plate apertures, said stand-offs being removably secured to said base plate to support said floor tile in spaced relation to said base plate;
said stand-offs forming a plurality of channels beneath said floor tile;
said stand-offs including means for removably engaging said floor tile locking element for removably interlocking said base plate to said floor tile; and
each of said stand-offs having a base portion including at least one radially located locking tab formed to pass through said base plate aperture keyways such that upon insertion of said stand-offs through said base plate apertures said stand-offs are removably secured to said base plate.

2. Floor structure according to claim 1 wherein said base plate is formed of a flexible material such that the bottom surface of said base plate substantially conforms to variations in the surface of an existing floor.

3. Floor structure according to claim 1 wherein said base plate is formed of plastic.

4. Floor structure according to claim 1 wherein said base plate is formed of sheet steel.

5. Floor structure according to claim 1 wherein said floor tile is formed of a rigid material with sufficient flexibility to allow the bottom surface of said floor tile to be in contacting relation with substantially all stand-off top surfaces.

6. Floor structure according to claim 1 further including a floor tile covering layer.

7. Floor structure according to claim 1 further including a sound proofing layer.

8. Floor structure according to claim 1 further including a fire proofing layer.

9. Floor structure according to claim 1 wherein each said stand-off is placed in locked engagement with said base plate by rotation of said stand-off about its vertical axis such that said stand-off locking tab is slidably secured against the bottom surface of said base plate.

10. Floor structure according to claim 1 wherein said stand-off base portion further includes at least one second radially located tab in axial alignment with and separated from said locking tab, said second tab forming a depth stop to limit axial movement of said stand-off through said base plate aperture.

11. Floor structure according to claim 10 wherein said the distance separating said stand-off locking tab and second tab slightly exceeds the thickness of said base plate.

12. Floor structure according to claim 1 wherein each said stand-off has side portions including axial slots.

13. Floor structure according to claim 12 wherein said axial slots are formed by two parallel radial projections.

14. Floor structure according to claim 12 further including webs mounted upon said stand-off axial slots, said webs including means for removably attaching an electrical junction block.

15. Floor structure according to claim 12 further including filler blocks removably mounted upon said stand-off axial slots, said filler blocks forming a continuous separating wall between adjacent stand-offs.

* * * * *